United States Patent [19]

Huls

[11] Patent Number: 5,597,566
[45] Date of Patent: Jan. 28, 1997

[54] VIBRATION DAMPING UNIVERSAL JOINT

[75] Inventor: Timothy A. Huls, Plymouth, Mich.

[73] Assignee: Ford Motor Company, Dearborn, Mich.

[21] Appl. No.: 879,047

[22] Filed: May 6, 1992

[51] Int. Cl.$^6$ .................. F16D 3/16; F16D 3/00
[52] U.S. Cl. .......... 464/119; 464/112; 464/114; 464/70; 403/57; 403/91; 403/97; 403/161
[58] Field of Search .................. 464/119, 112, 464/170, 114, 70; 403/158, 57, 91, 97, 161

[56] References Cited

U.S. PATENT DOCUMENTS

| | | | |
|---|---|---|---|
| 279,415 | 6/1883 | Miller | 464/119 |
| 2,044,392 | 6/1936 | Lord | 464/70 |
| 2,196,297 | 4/1940 | Gagne | 464/119 |
| 2,256,624 | 9/1941 | Odlum | 464/119 |
| 2,476,473 | 6/1949 | Ashton | 464/119 |
| 3,550,467 | 11/1968 | Forichon . | |
| 3,768,836 | 10/1973 | Walser | 403/158 |
| 3,899,934 | 8/1975 | Froumajou . | |
| 4,086,822 | 5/1978 | Kuroda . | |
| 4,166,366 | 9/1979 | Okuda et al. | 464/119 |
| 4,272,972 | 6/1981 | James | 464/119 |
| 4,711,461 | 12/1987 | Fromberg | 403/57 |
| 4,872,361 | 10/1989 | Muller . | |

FOREIGN PATENT DOCUMENTS

| | | | |
|---|---|---|---|
| 2215285 | 10/1973 | Germany . | |
| 2855024 | 6/1980 | Germany . | |
| 2129524 | 5/1984 | United Kingdom | 464/112 |

*Primary Examiner*—Bibhu Mohanty
*Attorney, Agent, or Firm*—Gregory P. Brown

[57] ABSTRACT

A vibration damping universal joint is disclosed for providing three degree of freedom orientation and limiting rotational deflection between a first and second rod portion of a manual transmission gear shift rod. The universal joint includes a first and a second clevis and a rotational isolation mechanism which provides axial deflection of the second rod portion relative to the second clevis and limits rotational deflection between the first and second rod portions.

5 Claims, 2 Drawing Sheets

VIBRATION DAMPING UNIVERSAL JOINT

BACKGROUND OF THE INVENTION

1. Field of the Invention

The present invention relates generally to universal joints. More particularly, the present invention relates to a vibration damping universal joint for use in a gear shift rod of a manual transmission for an automotive vehicle.

2. Disclosure Information

As is well known in the art, selection of gears in a vehicle with a manual transmission is done by a vehicle operator through sliding movement of a gear shift lever in the vehicle. The gear shift lever is connected to the transmission by a gear shift rod. Engine and transmission vibrations can be transmitted, with or without amplification, to the shift lever through the gear shift rod so that vibration or chattering of the shift lever can be felt by the driver. If the driver tries to forcibly dampen or prevent the chattering of the shift lever, disengagement of the shift may occur. Furthermore, when the gear shift rod comprises two or more rod portions joined by coupling joints, rotational deflection between the rod portions often gives the driver a sloppy, unprecise feel during shifting.

To overcome these problems, U.S. Pat. No. 4,872,361 proposes a shift rod having a damping body which uncouples the vibrations of the engine and transmission from the gear shift lever as well as provides precise shifting. The damping body is part of a coupling joint between two shifting rod segments of the transmission shift rod and is soft resiliently over a predetermined short distance. In the twisting direction of the shift rod, the damping body is developed to be very stiff with respect to torsion for precise selection of gears.

The damping body of the coupling joint comprises a rectangular damping plate and a metal plate surrounding the damping plate. The damping plate allows movement of the shift rod all along the longitudinal axis of the rod and is very stiff with respect to torsional movements of the rod. However, the coupling joint allows only for a single degree of freedom orientation between the transmission and the gear shift lever disposed in the vehicle. It would be advantageous to provide a coupling joint which provides for three degree of freedom orientation between the transmission and the gear shift lever of the vehicle while still providing for torsional resistance of the gear shift rod.

SUMMARY OF THE INVENTION

The present invention solves the problems associated with the prior art by providing a vibration damping universal joint for providing three degree of freedom orientation and limiting rotational deflection between a first rod portion and a second rod portion of a manual transmission gear shift rod for an automotive vehicle. The universal joint comprises a first clevis having a pair of flanges, each flange having an aperture for receiving a first pin therethrough for connecting the first rod portion thereto. The first pin defines a first axis of rotation perpendicular to the elongation axis of the first rod portion. The universal joint further comprises a second clevis attached to the first clevis, the second clevis including a pair of flanges, each flange having an aperture for receiving a second pin therethrough for connecting the second rod portion thereto. The second pin defines a second axis of rotation mutually perpendicular to the first axis and to the elongation axis of the second rod portion. The universal joint also comprises rotational isolation means interposed between the flanges of the second clevis and the second rod portion, the means being operative to provide axial deflection of the second rod portion relative to the second clevis along the elongation axis of the second rod portion and to limit rotational deflection between the first and second rod portions while providing for offset alignment about three mutually perpendicular axes of a manual transmission and a gear shift lever disposed in the vehicle.

It is an advantage of the present invention to provide three degree of freedom orientation between the manual transmission and the gear shift lever while preventing the noise generated by the engine and transmission from propagating through the shift rod to the shift lever.

These and other objects, features and advantages of the present invention will become apparent from the drawings, detailed description and claims which follow.

DETAILED DESCRIPTION OF THE PREFERRED EMBODIMENTS

Figure 1:
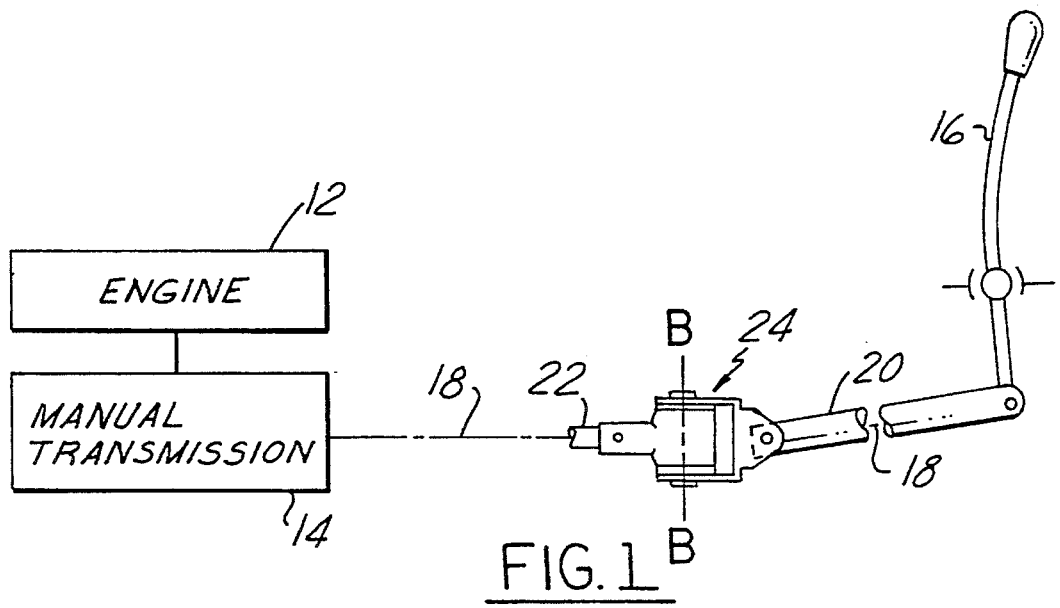
FIG. 1 is a schematic diagram of a gear shift rod connecting an automotive engine and a manual transmission with a manual gear shift lever constructed in accordance with the principles of the present invention.
Figure 2:
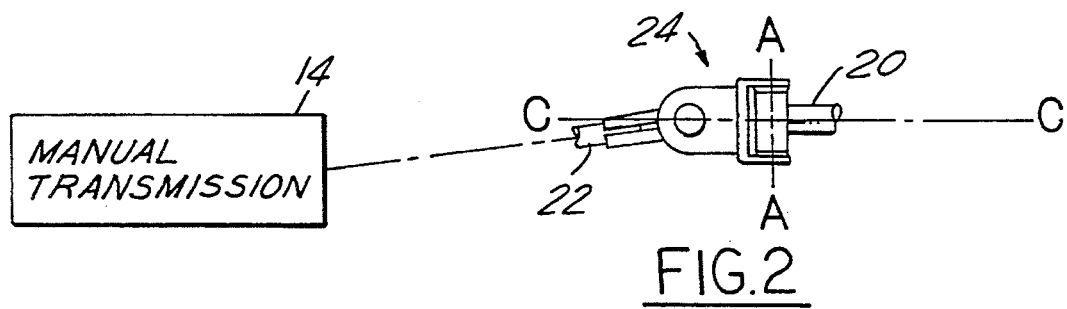
FIG. 2 is a top plan view of a portion of FIG. 1.

Referring to the drawings, FIGS. 1 and 2 schematically show an automotive engine 12 and a manual transmission 14 connected through a gear shift rod 18 to a gear shift lever 16 disposed inside an automotive vehicle. The gear shift rod 18 includes a first rod portion 20 connected to a second rod portion 22 through a vibration damping universal joint 24 of the present invention. The universal joint 24 allows for three degree of freedom orientation between the transmission and the gear shift lever 16 along three mutually perpendicular axes, shown in FIGS. 1 and 2 by lines A—A, B—B, and C—C.

As is well known in the art, selection of gears within the vehicle by vehicle operator is done through sliding movement of the gear shift lever 16 in the vehicle. Fore-and-aft and side-to-side movement of the gear shift lever 16 results in axial reciprocal movement of the gear shift rod 18 in a direction generally parallel to its longitudinal axis as well as rotational movement of rod 18 about its longitudinal axis. The universal joint 24 limits the rotational deflection between the first rod portion 20 and the second rod portion 22 of the gear shift rod 18 to provide for precise shifting, resulting in a "good feel" by the vehicle operator as well as to prevent the propagation of noise and vibration from the transmission through the gear shift rod 18 to the gear shift lever 16 as will be explained below.

Figure 3:
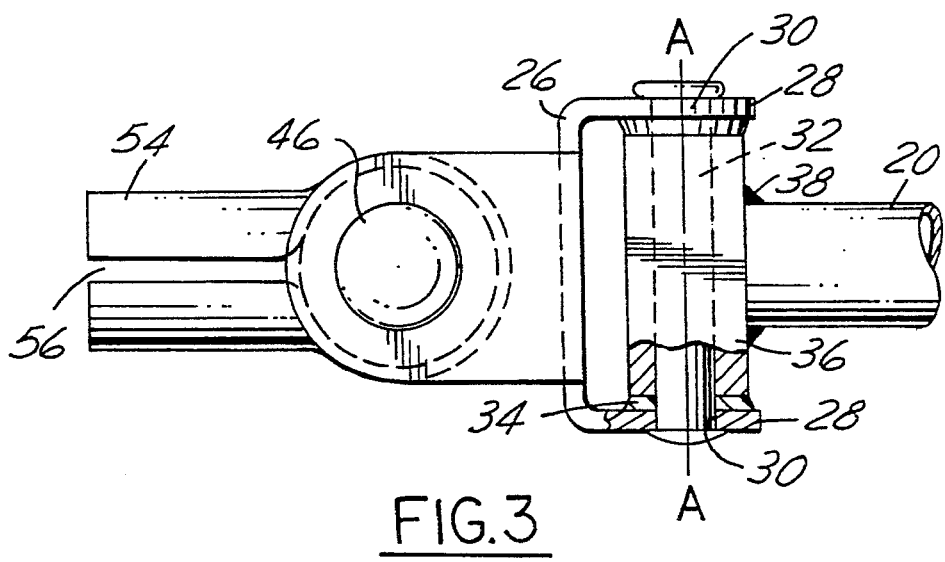
FIG. 3 is an enlarged view of the universal joint shown in FIG. 2.
Figure 4:
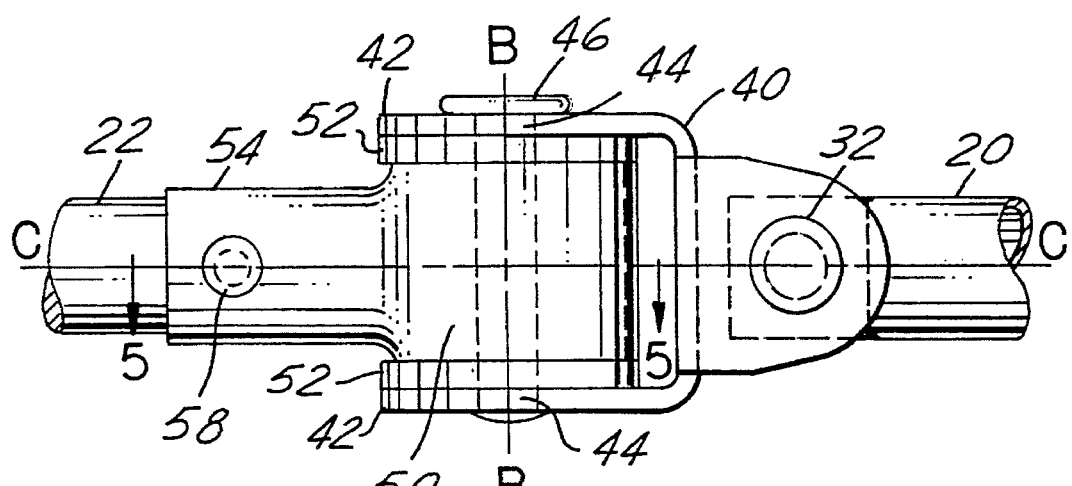
FIG. 4 is a side elevational view of the universal joint of FIG. 2.
Figure 5:
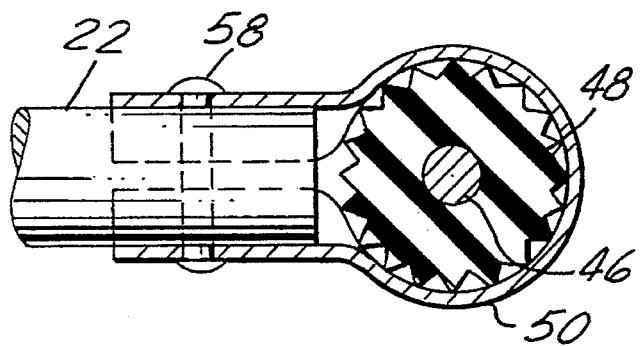
FIG. 5 is a cross-sectional view along line 5—5 of FIG. 4.

Referring now to FIGS. 3–5, the universal joint 24 includes a first clevis 26 comprising a pair of flanges 28. Each of the flanges 28 includes an aperture 30 for receiving a first pin 32 therethrough. The first pin 32 defines a first axis denoted by line A—A, about which the first rod portion 20 rotates. A bushing 34 surrounds first pin 32 and is enclosed by a generally cylindrical casing 36 disposed between flanges 28. The casing 36 is joined to the first rod portion through welds 38.

Universal joint 24 further includes a second clevis 40 comprising a pair of flanges 42 defining an aperture 44 in each flange. Apertures 44 receive a second pin 46 therethrough which defines a second axis denoted by line B—B. As shown in FIG. 5, the second pin 46 is surrounded by a cylindrical bushing 48 which in the preferred embodiment has a star-shaped cross-section. The star-shaped cross-section prevents the second rod portion 22 from slipping when rotated about axis B—B. A cylindrical casing 50, disposed between flanges 42 surrounds bushing 48. In the preferred embodiment, casing 50 is formed integrally with a hollow tubular extension 54 which receives the second rod portion 22 therein. The extension 54 may be slotted as at 56 to accommodate various diameters of rod portions. The second rod portion 22 is joined to extension 54 by a fastener 58 disposed through aperture in extension 54. Alternatively, a separate casing could be utilized and the second rod portion 22 can be welded thereto.

Interposed between the end surfaces of casing 50 and the inner surfaces of flanges 42 are a pair of disc-shaped bushings 52. The bushings are fabricated from an elastomeric synthetic material, preferably urethane, and provide for the axial displacement of the first rod portion 22 relative to clevis 40 in a direction generally parallel to the longitudinal axis (denoted by line C—C) of rod portion 22. The bushings 52 further prevent rotational deflection of rod portion 22 relative to clevis 40 and first rod portion 20. As such, the bushings 52 as well as the star-shaped bushing 48 comprise rotational isolation means. This isolation prevents the noise and vibration generated by the engine and transmission from propagating up the gear shift rod 18 to the manual shift lever 16. Keeping the deflection of the second rod portion 22 to a single linear axis, generally parallel to the longitudinal axis of the rod portion 22, maintains the torsional rigidity Of the joint. The torsional rigidity maintains the precision feel of the shift control when moving the shift lever from side to side in selecting driving gears.

In the preferred embodiment, the first 26 and second 40 clevis are integrally formed as a unit and may be formed in a variety of known manufacturing methods, such as through a stamping operation. The first and second clevises may be formed from any of a number of known materials, preferably, an alloy steel or a high-strength aluminum alloy.

It should be apparent to those skilled in the art that any variations of the present invention are possible without departing from the spirit and scope of the present invention. For example, the present invention may be utilized in other locations within a vehicle where it is desirable to limit rotational deflection between two rotating members, such as in a steering shaft assembly. It is the following claims, including all equivalents, which define the scope of my invention.

What is claimed is:

1. A vibration damping universal joint for providing three degree of freedom orientation and limiting rotational deflection between a first rod portion connected to a manual transmission and engine of an automotive vehicle and a second rod portion connected to a gear shift lever in said vehicle, said universal joint comprising:

a first clevis including a pair of flanges, each flange having an aperture for receiving a first pin therethrough for connecting said first rod portion thereto, said first pin defining a first axis of rotation perpendicular to the elongation axis of said first rod portion;

a second clevis formed integrally with said first clevis, said second clevis including a pair of flanges, each flange having an aperture for receiving a second pin therethrough for connecting said second rod portion thereto, said second pin defining a second axis of rotation mutually perpendicular to said first axis and the elongation axis of said second rod portion;

an elastomeric cylindrical bushing surrounding said second pin and disposed within a cylindrical casing, said cylindrical casing being operatively connected to said second rod portion, said cylindrical bushing being operative to reduce the transmission of vibrations generated at the manual transmission and engine into the shift lever by permitting the first rod portion to move relative to the second rod portion; and a pair of disc-shaped bushings interposed between an inner surface of each of said flanges of said second clevis and an outer surface of said cylindrical casing and said cylindrical bushing, said disc-shaped bushings being operative to allow axial displacement of the second rod portion parallel to the elongation axis of said second rod portion relative to said second pair of flanges, said disc-shaped bushings being further operative to allow rotation of said second rod portion about said second axis of rotation of said second pin, said disc-shaped bushings being further operative to limit rotations of said second rod portion and said casing about said longitudinal axis of said second rod portion thereby increasing the torsional rigidity between said first rod portion and said second rod portion to enhance the precision of changing gears in the manual transmission using the gear shift lever.

2. A universal joint according to claim 1, wherein said first and second clevis are formed by stamping.

3. A universal joint according to claim 1, wherein said pair of disc-shaped bushings are fabricated from urethane.

4. A universal joint according to claim 1, wherein said elastomeric bushing has a star-shaped cross-section.

5. A vibration damping universal joint for providing three degree of freedom orientation and limiting rotational deflection between a first rod portion connected to a manual transmission of an automotive vehicle and a second rod portion connected to a gear shift lever in said vehicle, said universal joint comprising:

a first clevis including a pair of flanges, each flange having an aperture for receiving a first pin therethrough for connecting said first rod portion thereto, said first pin defining a first axis of rotation perpendicular to the elongation axis of said first rod portion;

a second clevis formed integrally with said first clevis, said second clevis including a pair of flanges, each flange having an aperture for receiving a second pin therethrough for connecting said second rod portion thereto, said second pin defining a second axis of rotation mutually perpendicular to said first axis and the elongation axis of said second rod portion; and a pair of disc-shaped bushings interposed between an inner surface of each of said flanges of said second clevis and an outer surface of said second rod portion, said disc-shaped bushings being operative to provide axial deflection of said second rod portion relative to said second clevis and to limit rotational deflection between said first and second rod portions while providing for offset alignment about three mutually perpendicular axes of a manual transmission and a gear shift lever disposed in said vehicle.

* * * * *